(12) United States Patent
Kuroda et al.

(10) Patent No.: US 12,203,955 B2
(45) Date of Patent: Jan. 21, 2025

(54) SIGNAL PROCESSING DEVICE, INERTIAL SENSOR, SIGNAL PROCESSING METHOD, AND PROGRAM

(71) Applicant: Panasonic Intellectual Property Management Co., Ltd., Osaka (JP)

(72) Inventors: Keisuke Kuroda, Osaka (JP); Takuya Kajiwara, Osaka (JP); Junji Nakatsuka, Osaka (JP); Masaaki Nagai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 519 days.

(21) Appl. No.: 17/442,300

(22) PCT Filed: Jan. 9, 2020

(86) PCT No.: PCT/JP2020/000474
§ 371 (c)(1),
(2) Date: Sep. 23, 2021

(87) PCT Pub. No.: WO2020/195000
PCT Pub. Date: Oct. 1, 2020

(65) Prior Publication Data
US 2022/0155337 A1   May 19, 2022

(30) Foreign Application Priority Data
Mar. 27, 2019   (JP) ................................ 2019-061932

(51) Int. Cl.
*G01P 21/00*   (2006.01)
*G01P 15/08*   (2006.01)
(Continued)

(52) U.S. Cl.
CPC ............ *G01P 21/00* (2013.01); *G01P 15/125* (2013.01); *G01P 15/18* (2013.01); *G01P 2015/0865* (2013.01)

(58) Field of Classification Search
CPC ........ G01P 21/00; G01P 15/125; G01P 15/18; G01P 2015/0865; G01P 1/023
See application file for complete search history.

(56) References Cited

U.S. PATENT DOCUMENTS

| | | | |
|---|---|---|---|
| 2007/0233425 A1* | 10/2007 | Fujiwara | .................. G01P 15/18 |
| | | | 702/152 |
| 2008/0288200 A1 | 11/2008 | Noble | |

(Continued)

FOREIGN PATENT DOCUMENTS

| | | |
|---|---|---|
| JP | 2015-010856 A | 1/2015 |
| JP | 2018-077200 A | 5/2018 |

(Continued)

OTHER PUBLICATIONS

International Search Report and Written Opinion issued in International Patent Application No. PCT/JP2020/000474, dated Mar. 24, 2020; with partial English translation.

*Primary Examiner* — Eman A Alkafawi
*Assistant Examiner* — Dilara Sultana
(74) *Attorney, Agent, or Firm* — Rimon P.C.

(57) ABSTRACT

A signal processing device includes detection circuitry and correction circuitry. The detection circuitry includes a first detection unit and a second detection unit. The first detection unit generates at least one detection signal based on an associated one of output signals corresponding to each of at least two directions. The second detection unit has a broader detection range than the first detection unit and generates at least one correction signal based on the associated one of the output signals corresponding to each of the at least two directions. The correction circuitry corrects an associated (Continued)

one of the detection signals corresponding to each of the at least two directions with at least an associated one of the correction signals corresponding to at least one direction, other than one direction subjected to correction, out of the at least two directions.

14 Claims, 6 Drawing Sheets

(51) Int. Cl.
*G01P 15/125* (2006.01)
*G01P 15/18* (2013.01)

(56) References Cited

U.S. PATENT DOCUMENTS

| | | | |
|---|---|---|---|
| 2015/0131007 A1* | 5/2015 | Sasho | H03J 5/244 |
| | | | 348/731 |
| 2016/0202287 A1 | 7/2016 | Mori et al. | |
| 2018/0058854 A1* | 3/2018 | Suzuki | G01C 19/5726 |
| 2019/0360809 A1* | 11/2019 | Kabasawa | G01P 15/18 |

FOREIGN PATENT DOCUMENTS

| | | | | |
|---|---|---|---|---|
| WO | 2015/052926 A1 | 4/2015 | | |
| WO | WO-2018016190 A1 * | 1/2018 | | B81B 7/02 |
| WO | WO-2018088041 A1 * | 5/2018 | | A63B 24/0003 |

* cited by examiner

FIG. 6

# SIGNAL PROCESSING DEVICE, INERTIAL SENSOR, SIGNAL PROCESSING METHOD, AND PROGRAM

CROSS-REFERENCE OF RELATED APPLICATIONS

This application is the U.S. National Phase under 35 U.S.C. § 371 of International Patent Application No. PCT/JP2020/000474, filed on Jan. 9, 2020, which in turn claims the benefit of Japanese Application No. 2019-061932, filed on Mar. 27, 2019, the entire disclosures of which Applications are incorporated by reference herein.

TECHNICAL FIELD

The present disclosure generally relates to a signal processing device, an inertial sensor, a signal processing method, and a program. More particularly, the present disclosure relates to a signal processing device for processing a signal supplied from a detection element to detect inertial force, an inertial sensor, a signal processing method, and a program.

BACKGROUND ART

Patent Literature 1 describes an acceleration sensor (inertial sensor) used in, for example, vehicles, navigation devices, and mobile telecommunications devices. The acceleration sensor of Patent Literature 1 includes a sensor unit (detection element) and a detection circuit (signal processing device). The detection circuit includes a CV converter circuit, a signal regulator circuit, and an A/D converter circuit (a first detection unit and a second detection unit). The CV converter circuit converts a change in capacitance caused by the sensor unit into a voltage. The signal regulator circuit samples an output voltage of the CV converter circuit and amplifies the output voltage to a predetermined sensitivity after adding an offset voltage to the output voltage sampled. The A/D converter circuit converts the output voltage of the signal regulator circuit into a digital value and provides the output voltage thus digitized.

If the acceleration sensor of Patent Literature 1 is a triaxial acceleration sensor, at least one of acceleration in the Y-axis direction and acceleration in the Z-axis direction may affect, for example, acceleration in the X-axis direction. In that case, the effect of the above acceleration needs to be reduced, but acceleration, of which the magnitude exceeds the dynamic range of the AD converter circuit, sometimes cannot be reduced sufficiently.

To overcome this problem, a method of extending the dynamic range of the A/D converter circuit may be adopted. However, this leads to the problem that the minimum resolution decreases as the dynamic range is extended, because there is a trade-off relationship between the dynamic range and the minimum resolution.

CITATION LIST

Patent Literature

Patent Literature 1: WO 2015/052926 A1

SUMMARY OF INVENTION

It is therefore an object of the present disclosure to provide a signal processing device, an inertial sensor, a signal processing method, and a program, all of which are configured or designed to reduce the effect of other axis sensitivity while curbing a decrease in sensitivity.

A signal processing device according to an aspect of the present disclosure includes detection circuitry and correction circuitry. The detection circuitry generates detection signals based on output signals of at least one detection element that detects inertial force in at least two of three directions perpendicular to each other. The correction circuitry corrects the detection signals. The detection circuitry includes a first detection unit and a second detection unit. The first detection unit generates at least one of the detection signals based on an associated one of the output signals corresponding to each of the at least two directions. The second detection unit has a broader detection range than the first detection unit and generates at least one correction signal based on the associated one of the output signals corresponding to each of the at least two directions. The correction circuitry corrects an associated one of the detection signals corresponding to each of the at least two directions with at least an associated one of the correction signals corresponding to at least one direction, other than one direction subjected to correction, out of the at least two directions.

An inertial sensor according to another aspect of the present disclosure includes the signal processing device described above and the at least one detection element.

A signal processing method according to still another aspect of the present disclosure is a signal processing method for processing output signals of at least one detection element that detects inertial force in at least two of three directions perpendicular to each other. The signal processing method includes a first detection step, a second detection step, and a correction step. The first detection step includes generating detection signals based on the output signals corresponding to the at least two directions. The second detection step includes generating, in a detection range broader than in the first detection step, correction signals based on the output signals corresponding to the at least two directions. The correction step includes correcting the detection signals. The correction step includes correcting an associated one of the detection signals corresponding to each of the at least two directions with at least an associated one of the correction signals corresponding to at least one direction, other than one direction subjected to correction, out of the at least two directions.

A program according to yet aspect of the present disclosure is designed to cause one or more processors to perform the signal processing method described above.

DESCRIPTION OF EMBODIMENTS

Embodiment

Figure 3:
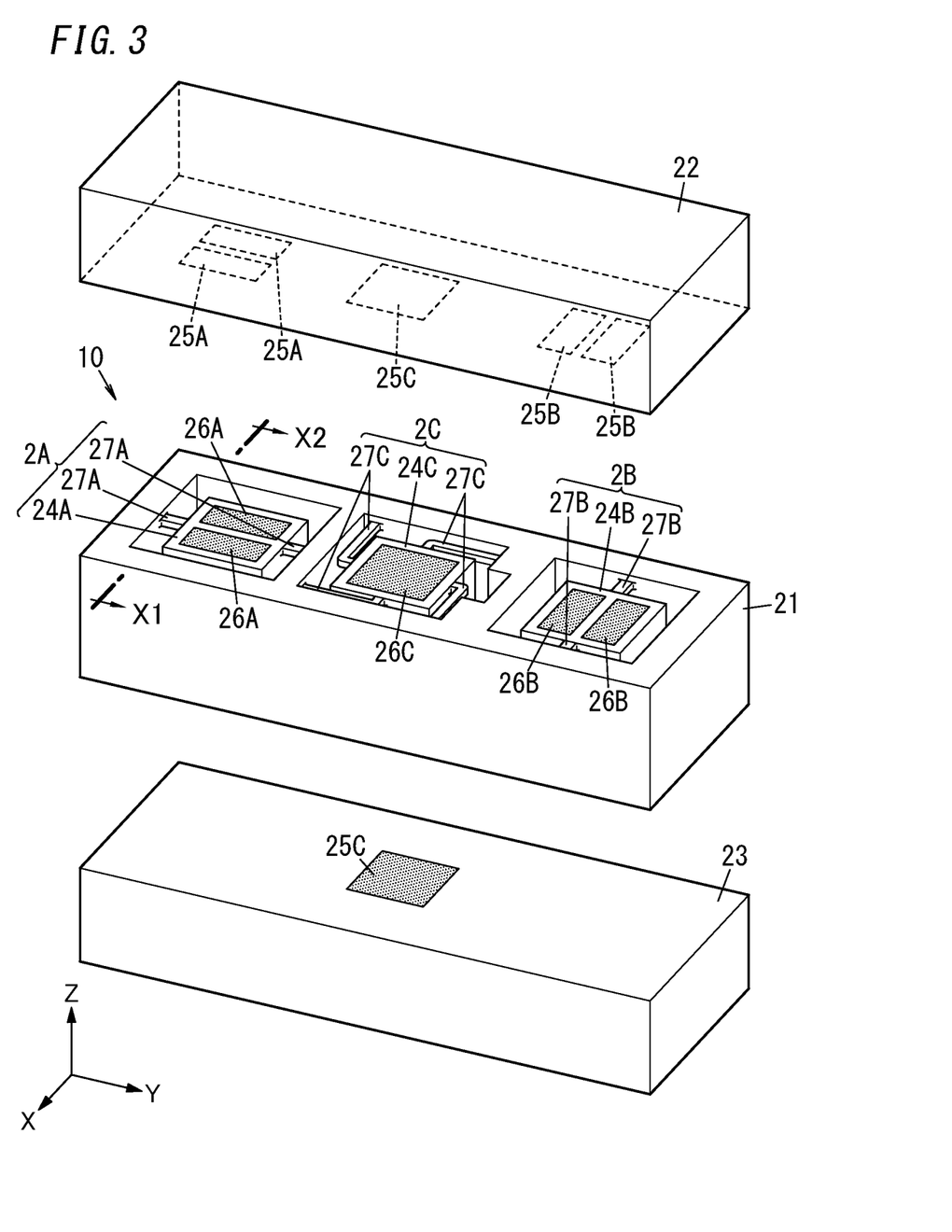
FIG. 3 is an exploded perspective view of a detection element as a constituent element of the inertial sensor.
Figure 4:
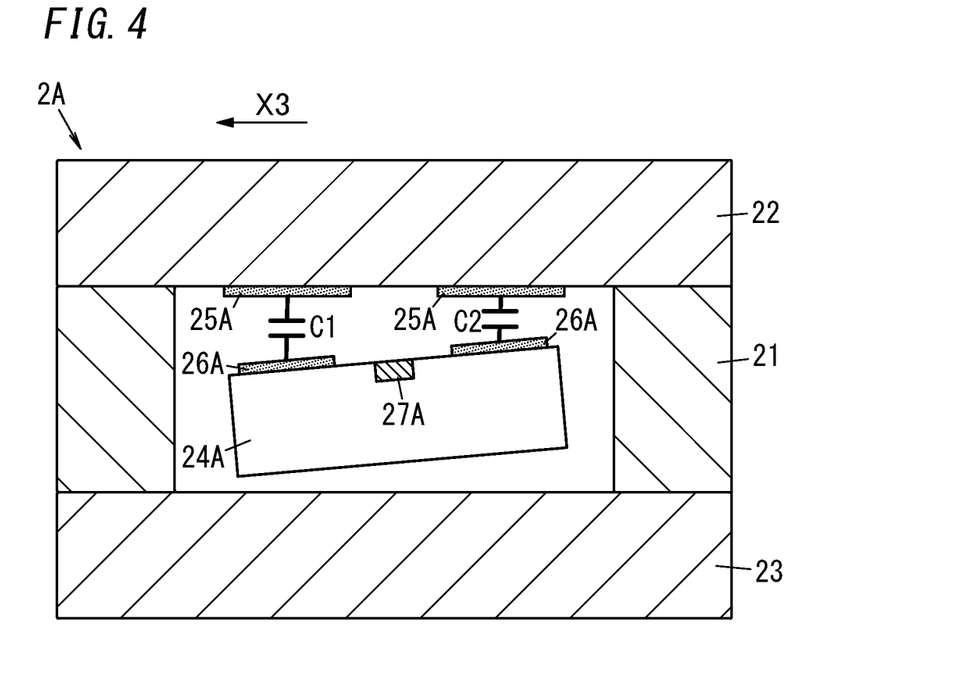
FIG. 4 is a cross-sectional view taken along the plane X1-X2 shown in FIG. 3.

FIGS. 3 and 4 to be referred to in the following description of an embodiment and its variations are all schematic representations. Thus, the ratio of the dimensions (including thicknesses) of respective constituent elements illustrated on the drawings does not always reflect their actual dimensional ratio.

(1) Overview

An overview of an inertial sensor 10 according to this embodiment will be described with reference to FIGS. 1 and 2.

The inertial sensor 10 according to this embodiment is a sensor for detecting inertial force, and may be, for example, a triaxial acceleration sensor which detects acceleration in three axial directions perpendicular to each other. Specifically, the inertial sensor 10 according to this embodiment may detect acceleration in the X-axis direction, acceleration in the Y-axis direction, and acceleration in the Z-axis direction. As shown in FIGS. 2A and 2B, the inertial sensor 10 may be, for example, a surface-mounted acceleration sensor which is mounted on one surface (reference surface) 101 of a printed wiring board 100. The inertial sensor 10 may be implemented, for example, as a capacitive acceleration sensor (see FIG. 4).

Figure 1:
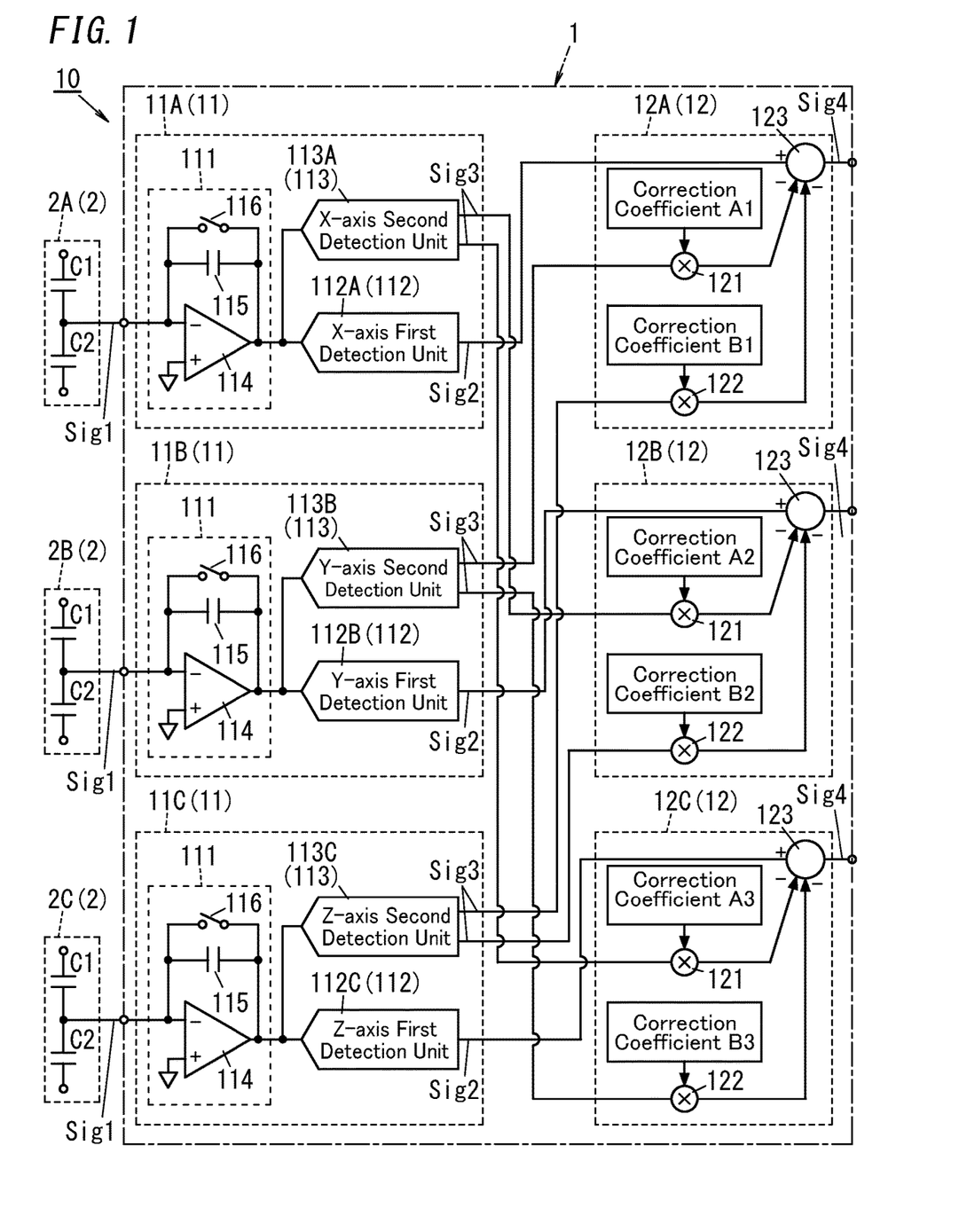
FIG. 1 is a schematic diagram showing a configuration for a signal processing device and an inertial sensor according to an exemplary embodiment of the present disclosure.

As shown in FIG. 1, the inertial sensor 10 according to this embodiment includes a signal processing device 1 and a plurality of (three in the example illustrated in FIG. 1) detection elements 2. The signal processing device 1 may be, for example, an ASIC (Application Specific Integrated Circuit). Moreover, in this embodiment, the detection elements 2 include an X-axis detection element 2A, a Y-axis detection element 2B, and a Z-axis detection element 2C. The X-axis detection element 2A detects inertial force (acceleration) in the X-axis direction. The Y-axis detection element 2B detects inertial force (acceleration) in the Y-axis direction. The Z-axis detection element 2C detects inertial force (acceleration) in the Z-axis direction. In the following description, when there is no particular need to distinguish the X-axis detection element 2A, the Y-axis detection element 2B, and the Z-axis detection element 2C from each other, the X-axis detection element 2A, the Y-axis detection element 2B, and the Z-axis detection element 2C will be hereinafter collectively or individually referred to as a "detection element 2".

Figure 2A:
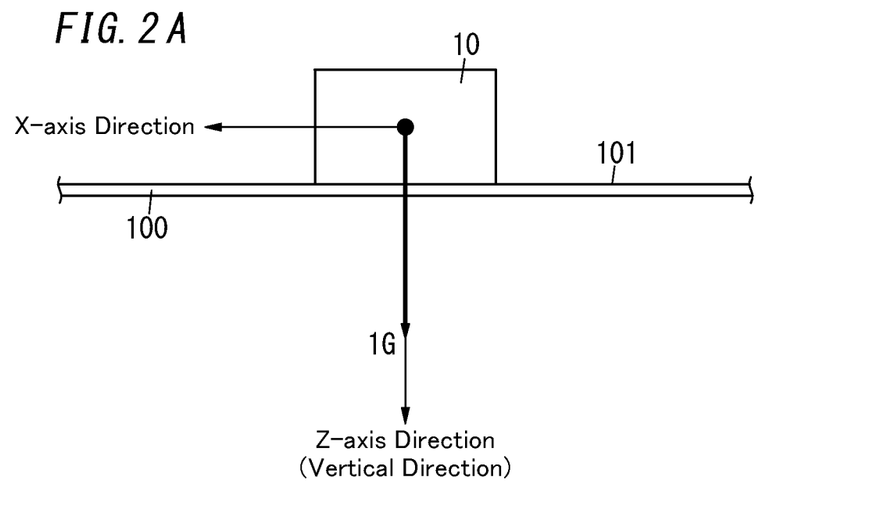
FIG. 2A illustrates the concept of the other axis sensitivity of the inertial sensor.
Figure 2B:
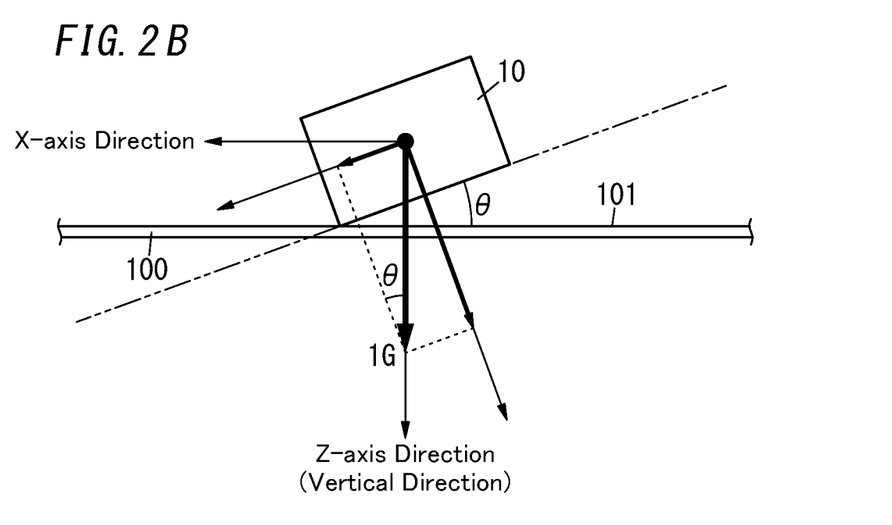
FIG. 2B illustrates the concept of the other axis sensitivity of the inertial sensor.

FIGS. 2A and 2B are schematic representations illustrating a state in which the inertial sensor 10 according to this embodiment is mounted on the printed wiring board 100. In FIGS. 2A and 2B, one surface (upper surface) 101 of the printed wiring board 100 serves as the reference surface (hereinafter referred to as a "reference surface 101"). FIG. 2A shows the other axis sensitivity in a case where the tilt angle of the inertial sensor 10 with respect to the reference surface 101 is zero degrees. FIG. 2B shows the other axis sensitivity in a case where the tilt angle of the inertial sensor 10 with respect to the reference surface 101 is θ (θ>0) degrees. As used herein, the "other axis sensitivity" refers to the degree to which the sensor output in the direction aligned with the axis of measurement is affected by the acceleration applied in a direction other than the direction aligned with the axis of measurement, i.e., the acceleration applied in the axial direction perpendicular to the axis of measurement. For example, as shown in FIGS. 2A and 2B, in a case where gravitational acceleration 1G is applied in the vertical direction (Z-axis direction), the other axis sensitivity refers to a situation where a component of the gravitational acceleration 1G applied in the vertical direction is detected in an axial direction (e.g., the X-axis direction in FIGS. 2A and 2B) other than the Z-axis direction.

In FIG. 2A, the gravitational acceleration 1G applied in the vertical direction acts only in the Z-axis direction and does not act in the X-axis direction. That is to say, in FIG. 2A, the sensor output in the X-axis direction is zero, and the sensor output in the Z-axis direction is 1G In this case, the other axis sensitivity in the X-axis direction caused by the gravitational acceleration 1G applied in the vertical direction is zero. On the other hand, in FIG. 2B, the inertial sensor 10 is tilted with respect to the reference surface 101 of the printed wiring board 100. Therefore, the gravitational acceleration 1G applied in the vertical direction is decomposed into a component of the gravitational acceleration 1G applied in the Z-axis direction and a component of the gravitational acceleration 1G applied in the X-axis direction. In the example shown in FIG. 2B, the tilt angle of the inertial sensor 10 with respect to the reference surface 101 is θ degrees. Thus, the Z-axis component of the gravitational acceleration 1G is given by (1G×cos θ), and the X-axis component of the gravitational acceleration 1G is given by (1G×sin θ). In this case, the other axis sensitivity in the X-axis direction caused by the gravitational acceleration 1G applied in the vertical direction is (1G×sin θ). Such other axis sensitivity needs to be reduced by correction, since it is an error component in the X-axis direction.

Various methods for correcting such error components caused by the other axis sensitivity have been provided in the pertinent art. Nonetheless, for example, the acceleration sensor of the above-cited Patent Literature 1 may be unable to correct the error caused by the other axis sensitivity, if the magnitude of the acceleration causing the other axis sensitivity is larger than the dynamic range (full-scale voltage) of the A/D converter circuit. In that case, the dynamic range of the A/D converter circuit may be increased to overcome the above problem. However, this leads to a problem that the minimum resolution (signal accuracy) decreases as the dynamic range is extended, because there is a trade-off relationship between the dynamic range of the A/D converter circuit and the minimum resolution. The signal processing device 1 according to this embodiment adopts the following configuration to reduce the effect of other axis sensitivity while curbing the decrease in sensitivity (minimum resolution).

As shown in FIG. 1, the signal processing device 1 according to this embodiment includes detection circuitry 11 and correction circuitry 12. The detection circuitry 11 generates detection signals Sig2 based on output signals Sig1 of at least one detection element 2 that detects inertial force in at least two of three directions perpendicular to each other. The correction circuitry 12 corrects the detection signals Sig2. The detection circuitry 11 includes a first detection unit 112 and a second detection unit 113. The first detection unit 112 generates at least one of the detection signals Sig2 based on an associated one of the output signals Sig1 corresponding to each of the at least two directions. The second detection unit 113 has a broader detection range than the first detection unit 112 and generates at least one correction signal Sig3 based on the associated one of the output signals Sig1 corresponding to each of the at least two directions. The correction circuitry 12 corrects an associated one of the detection signals Sig2 corresponding to each of the at least two directions with an associated one of the correction signals Sig3 corresponding to at least one direction, other than one direction subjected to correction, out of the at least two directions.

As described above, in the signal processing device 1 according to this embodiment, the detection range (full-scale range) of the second detection unit 113 generating the correction signal Sig3 is broader than the detection range (full-scale range) of the first detection unit 112 generating the detection signal Sig2. Therefore, as for acceleration, the decrease in sensitivity may be curbed by having the acceleration detected by the first detection unit 112 that has a narrower detection range than the second detection unit 113. Meanwhile, as for the other axis sensitivity, even if the magnitude of the acceleration causing the other axis sensitivity is significant, the effect of other axis sensitivity may be reduced by having the other axis sensitivity detected by the second detection unit 113 that has a broader detection range than the first detection unit 112. In short, the signal processing device 1 according to this embodiment may reduce the effect of the other axis sensitivity while curbing a decrease in sensitivity (minimum resolution).

(2) Configuration

Next, a configuration of the inertial sensor 10 according to this embodiment will be described with reference to FIGS. 1, 3, and 4.

As shown in FIG. 1, the inertial sensor 10 according to this embodiment includes the signal processing device 1 and a plurality of (e.g., three in the example illustrated in FIG. 1) detection elements 2.

(2.1) Signal Processing Device

The signal processing device 1 includes a plurality of (e.g., three in the example illustrated in FIG. 1) detection circuits 11 and a plurality of (e.g., three in the example illustrated in FIG. 1) correction circuits 12.

Each of the plurality of detection circuits 11 is a detection circuit selected from an X-axis detection circuit 11A, a Y-axis detection circuit 11B, and a Z-axis detection circuit 11C. The X-axis detection circuit 11A generates the detection signal Sig2 based on the output signal Sig1 of an X-axis detection element 2A to be described later. The Y-axis detection circuit 11B generates the detection signal Sig2 based on the output signal Sig1 of a Y-axis detection element 2B to be described later. The Z-axis detection circuit 11C generates the detection signal Sig2 based on the output signal Sig1 of a Z-axis detection element 2C to be described later.

Moreover, each of the plurality of correction circuits 12 is a correction circuit selected from an X-axis correction circuit 12A, a Y-axis correction circuit 12B, and a Z-axis correction circuit 12C. The X-axis correction circuit 12A corrects an error caused by the other axis sensitivity in the X-axis direction. The Y-axis correction circuit 12B corrects an error caused by the other axis sensitivity in the Y-axis direction. The Z-axis correction circuit 12C corrects an error caused by the other axis sensitivity in the Z-axis direction.

In the following description, when there is no particular need to distinguish the X-axis detection circuit 11A, the Y-axis detection circuit 11B, and the Z-axis detection circuit 11C from each other, the X-axis detection circuit 11A, the Y-axis detection circuit 11B, and the Z-axis detection circuit 11C will be hereinafter collectively or individually referred to as "detection circuitry 11". Furthermore, in the following description, when there is no particular need to distinguish the X-axis correction circuit 12A, the Y-axis correction circuit 12B, and the Z-axis correction circuit 12C from each other, the X-axis correction circuit 12A, the Y-axis correction circuit 12B, and the Z-axis correction circuit 12C will be hereinafter collectively or individually referred to as "correction circuitry 12".

(2.1.1) X-Axis Detection Circuit

As shown in FIG. 1, the X-axis detection circuit 11A includes a CV converter circuit 111, an X-axis first detection unit 112A, and an X-axis second detection unit 113A. In other words, the X-axis detection circuit 11A includes the X-axis first detection unit 112A serving as the first detection unit 112 and the X-axis second detection unit 113A serving as the second detection unit 113.

The CV converter circuit 111 converts a change in capacitance caused by the X-axis detection element 2A into a voltage. The CV converter circuit 111 includes an amplifier 114, a capacitor 115, and a switch 116. An inverting input terminal of the amplifier 114 is electrically connected to a node of connection between two capacitors C1, C2 which form part of the X-axis detection element 2A. The capacitor 115 and the switch 116 are electrically connected in parallel between the inverting input terminal and an output terminal of the amplifier 114. Moreover, a reference voltage is input to a non-inverting input terminal of the amplifier 114.

The X-axis first detection unit 112A may be implemented, for example, as an A/D converter. In other words, the first detection unit 112 includes the A/D converter. The X-axis first detection unit 112A generates a digital detection signal Sig2 based on an analog output signal Sig1 supplied from the X-axis detection element 2A via the CV converter circuit 111. The detection signal Sig2 is supplied from the X-axis first detection unit 112A to a subtractor 123 of an X-axis correction circuit 12A to be described later.

The X-axis second detection unit 113A may be implemented, for example, as an A/D converter. In other words, the second detection unit 113 includes the A/D converter. The X-axis second detection unit 113A generates a digital correction signal Sig3 based on an analog output signal Sig1 supplied from the X-axis detection element 2A via the CV converter circuit 111. The correction signal Sig3 is supplied from the X-axis second detection unit 113A to a first multiplier 121 of a Y-axis correction circuit 12B to be described later and a first multiplier 121 of a Z-axis correction circuit 12C to be described later.

(2.1.2) Y-Axis Detection Circuit

As shown in FIG. 1, the Y-axis detection circuit 11B includes a CV converter circuit 111, a Y-axis first detection unit 112B, and a Y-axis second detection unit 113B. In other words, the Y-axis detection circuit 11B includes the Y-axis first detection unit 112B serving as the first detection unit 112 and the Y-axis second detection unit 113B serving as the second detection unit 113. The CV converter circuit 111 of this Y-axis detection circuit 11B has the same configuration as the CV converter circuit 111 of the X-axis detection circuit 11A described above, and therefore, description thereof will be omitted herein.

The Y-axis first detection unit 112B may be implemented, for example, as an A/D converter. In other words, the first detection unit 112 includes the A/D converter. The Y-axis first detection unit 112B generates a digital detection signal Sig2 based on an analog output signal Sig1 supplied from the Y-axis detection element 2B via the CV converter circuit 111. The detection signal Sig2 is supplied from the Y-axis first detection unit 112B to a subtractor 123 of a Y-axis correction circuit 12B.

The Y-axis second detection unit 113B may be implemented, for example, as an A/D converter. In other words, the second detection unit 113 includes the A/D converter.

The Y-axis second detection unit 113B generates a digital correction signal Sig3 based on an analog output signal Sig1 supplied from the Y-axis detection element 2B via the CV converter circuit 111. The correction signal Sig3 is supplied from the Y-axis second detection unit 113B to a second multiplier 122 of a Z-axis correction circuit 12C and the first multiplier 121 of the X-axis correction circuit 12A.

(2.1.3) Z-Axis Detection Circuit

As shown in FIG. 1, the Z-axis detection circuit 11C includes a CV converter circuit 111, a Z-axis first detection unit 112C, and a Z-axis second detection unit 113C. In other words, the Z-axis detection circuit 11C includes the Z-axis first detection unit 112C serving as the first detection unit 112 and the Z-axis second detection unit 113C serving as the second detection unit 113. The CV converter circuit 111 of this Z-axis detection circuit 11C has the same configuration as the CV converter circuit 111 of the X-axis detection circuit 11A described above, and therefore, description thereof will be omitted herein.

The Z-axis first detection unit 112C may be implemented, for example, as an A/D converter. In other words, the first detection unit 112 includes the A/D converter. The Z-axis first detection unit 112C generates a digital detection signal Sig2 based on an analog output signal Sig1 supplied from the Z-axis detection element 2C via the CV converter circuit 111. The detection signal Sig2 is supplied from the Z-axis first detection unit 112C to a subtractor 123 of a Z-axis correction circuit 12C.

The Z-axis second detection unit 113C may be implemented, for example, as an A/D converter. In other words, the second detection unit 113 includes the A/D converter. The Z-axis second detection unit 113C generates a digital correction signal Sig3 based on an analog output signal Sig1 supplied from the Z-axis detection element 2C t via the CV converter circuit 111. The correction signal Sig3 is supplied from the Z-axis second detection unit 113C to the second multiplier 122 of the X-axis correction circuit 12A and the second multiplier 122 of the Y-axis correction circuit 12B.

In this embodiment, if the acceleration detection range of the first detection unit 112 is ±6G, the acceleration detection range of the second detection unit 113 is preferably ±30G, for example. This allows the error caused by the other axis sensitivity to be corrected over a broad range.

(2.1.4) X-Axis Correction Circuit

As shown in FIG. 1, the X-axis correction circuit 12A includes the first multiplier 121, the second multiplier 122, and the subtractor 123.

The first multiplier 121 multiplies the correction signal Sig3 supplied from the Y-axis second detection unit 113B by a correction coefficient A1 and outputs the calculation result to the subtractor 123. The second multiplier 122 multiplies the correction signal Sig3 supplied from the Z-axis second detection unit 113C by a correction coefficient B1 and outputs the calculation result to the subtractor 123. The subtractor 123 subtracts the two correction signals Sig3, each of which has been multiplied by their associated correction coefficient, from the detection signal Sig2 supplied from the X-axis first detection unit 112A. This allows the other axis sensitivity in the X-axis direction caused by the acceleration in the Y-axis direction and the other axis sensitivity in the X-axis direction caused by the acceleration in the Z-axis direction to be corrected.

(2.1.5) Y-Axis Correction Circuit

As shown in FIG. 1, the Y-axis correction circuit 12B includes the first multiplier 121, the second multiplier 122, and the subtractor 123.

The first multiplier 121 multiplies the correction signal Sig3 supplied from the X-axis second detection unit 113A by a correction coefficient A2 and outputs the calculation result to the subtractor 123. The second multiplier 122 multiplies the correction signal Sig3 supplied from the Z-axis second detection unit 113C by a correction coefficient B2 and outputs the calculation result to the subtractor 123. The subtractor 123 subtracts the two correction signals Sig3, each of which has been multiplied by their associated correction coefficient, from the detection signal Sig2 supplied from the Y-axis first detection unit 112B. This allows the other axis sensitivity in the Y-axis direction caused by the acceleration in the Z-axis direction and the other axis sensitivity in the Y-axis direction caused by the acceleration in the X-axis direction to be corrected.

(2.1.6) Z-Axis Correction Circuit

As shown in FIG. 1, the Z-axis correction circuit 12C includes the first multiplier 121, the second multiplier 122, and the subtractor 123.

The first multiplier 121 multiplies the correction signal Sig3 supplied from the X-axis second detection unit 113A by a correction coefficient A3 and outputs the calculation result to the subtractor 123. The second multiplier 122 multiplies the correction signal Sig3 supplied from the Y-axis second detection unit 113B by a correction coefficient B3 and outputs the calculation result to the subtractor 123. The subtractor 123 subtracts the two correction signals Sig3, each of which has been multiplied by their associated correction coefficient, from the detection signal Sig2 supplied from the Z-axis first detection unit 112C. This allows the other axis sensitivity in the Z-axis direction caused by the acceleration in the X-axis direction and the other axis sensitivity in the Z-axis caused by the acceleration in the Y-axis direction to be corrected. These correction coefficients A1-A3, B1-B3 are stored in registers of the ASIC.

(2.2) Detection Element

Each of the plurality of detection elements 2 is a detection element selected from the X-axis detection element 2A, the Y-axis detection element 2B, and the Z-axis detection element 2C. The X-axis detection element 2A detects inertial force (acceleration) in the X-axis direction. The Y-axis detection element 2B detects inertial force (acceleration) in the Y-axis direction. The Z-axis detection element 2C detects inertial force (acceleration) in the Z-axis direction.

As shown in FIG. 3, the inertial sensor 10 according to this embodiment further includes a housing 21, an upper cover 22, and a lower cover 23. Each of the housing 21, the upper cover 22, and the lower cover 23 is formed in a rectangular parallelepiped shape elongated in the Y-axis direction, and their external dimensions (dimensions in the X-axis direction and dimensions in the Y-axis direction) are generally the same when viewed in the Z-axis direction.

The X-axis detection element 2A includes a weight 24A, a pair of fixed electrodes 25A, 25A, and a pair of moving electrodes 26A, 26A. The weight 24A is formed in a rectangular shape when viewed in the Z-axis direction. The weight 24A is fixed to the housing 21 via a pair of beams 27A, 27A at both ends in the Y-axis direction. The pair of moving electrodes 26A, 26A are mounted on the upper surface of the weight 24A (the surface facing the upper cover 22) in a state where the pair of moving electrodes 26A, 26A are arranged side by side in the X-axis direction. The pair of fixed electrodes 25A, 25A are mounted on the lower surface of the upper cover 22 (the surface facing the housing 21) in a state where the pair of fixed electrodes 25A, 25A are arranged side by side in the X-axis direction. The pair of fixed electrodes 25A, 25A and the pair of moving electrodes 26A, 26A face each other with a predetermined gap left between themselves in a state where the housing 21 and the upper cover 22 are laid one on top of the other. The X-axis detection element 2A is configured to, when acceleration is applied in the X-axis direction, swing in a ZX plane around the pair of beams 27A, 27A as a fulcrum.

The Y-axis detection element 2B includes a weight 24B, a pair of fixed electrodes 25B, 25B, and a pair of moving electrodes 26B, 26B. The weight 24B is formed in a rectangular shape when viewed in the Z-axis direction. The weight 24B is fixed to the housing 21 via a pair of beams 27B, 27B at both ends in the X-axis direction. The pair of moving electrodes 26B, 26B are mounted on the upper surface of the weight 24B (the surface facing the upper cover 22) in a state where the pair of moving electrodes 26B, 26B are arranged side by side in the Y-axis direction. The pair of fixed electrodes 25B, 25B are mounted on the lower surface of the upper cover 22 (the surface facing the housing 21) in a state where the pair of fixed electrodes 25B, 25B are arranged side by side in the Y-axis direction. The pair of fixed electrodes 25B, 25B and the pair of moving electrodes 26B, 26B face each other with a predetermined gap left between themselves in a state where the housing 21 and the upper cover 22 are laid one on top of the other. The Y-axis detection element 2B is configured to, when acceleration is applied in the Y-axis direction, swing in a YZ plane around the pair of beams 27B, 27B as a fulcrum.

The Z-axis detection element 2C includes a weight 24C, a pair of fixed electrodes 25C, 25C, and a pair of moving electrodes 26C, 26C (of which only the upper moving electrode 26C is shown in FIG. 3). The weight 24C is formed in a rectangular shape when viewed in the Z-axis direction. The weight 24C is fixed to the housing 21 via four beams 27C, each of which is formed in an L shape. The pair of moving electrodes 26C, 26C are mounted on both surfaces in the Z-axis direction of the weight 24C. One fixed electrode 25C out of the pair of fixed electrodes 25C, 25C is mounted on the lower surface of the upper cover 22. Meanwhile, the other fixed electrode 25C out of the pair of fixed electrodes 25C, 25C is mounted on the upper surface of the lower cover 23. The one fixed electrode 25C out of the pair of fixed electrodes 25C, 25C and one moving electrode 26C out of the pair of moving electrodes 26C, 26C face each other with a predetermined gap left between themselves in a state where the housing 21, the upper cover 22, and the lower cover 23 are laid one on top of the other. Meanwhile, the other fixed electrode 25C out of the pair of fixed electrodes 25C, 25C and the other moving electrode 26C out of the pair of moving electrodes 26C, 26C face each other with a predetermined gap left between themselves in a state where the housing 21, the upper cover 22, and the lower cover 23 are laid one on top of the other. The Z-axis detection element 2C is configured to, when acceleration is applied in the Z-axis direction, be movable in the Z-axis direction around the four beams 27C as a fulcrum.

FIG. 4 is a cross-sectional view taken along the plane X1-X2 shown in FIG. 3 and illustrates the X-axis detection element 2A. One fixed electrode 25A (illustrated on the left side in FIG. 4) out of the pair of fixed electrodes 25A, 25A and one moving electrode 26A (illustrated on the left side in FIG. 4) out of the pair of moving electrodes 26A, 26A form the capacitor C1. Moreover, the other fixed electrode 25A (illustrated on the right side in FIG. 4) out of the pair of fixed electrodes 25A, 25A and the other moving electrode 26A (illustrated on the right side in FIG. 4) out of the pair of moving electrodes 26A, 26A form the capacitor C2. Suppose a situation where acceleration is acting to this structure in the direction indicated by the arrow X3 (hereinafter referred to as "X3 direction") in FIG. 4. In that case, the weight 24A of the X-axis detection element 2A is caused, by the acceleration thus applied, to swing in the ZX plane around the pair of beams 27A, 27A as a fulcrum. In the example shown in FIG. 4, upon the application of the acceleration in the X3 direction, the gap between one fixed electrode 25A and one moving electrode 26A has broadened, while the gap between the other fixed electrode 25A and the other moving electrode 26A has narrowed. This causes a decrease in the capacitance of the capacitor C1 and an increase in the capacitance of the capacitor C2, compared to a situation where no acceleration is applied in the X3 direction. Therefore, the inertial sensor 10 according to this embodiment may detect the acceleration applied in the X3 direction based on the capacitance values of these two capacitors C1 and C2.

(3) Operation

Figure 5:
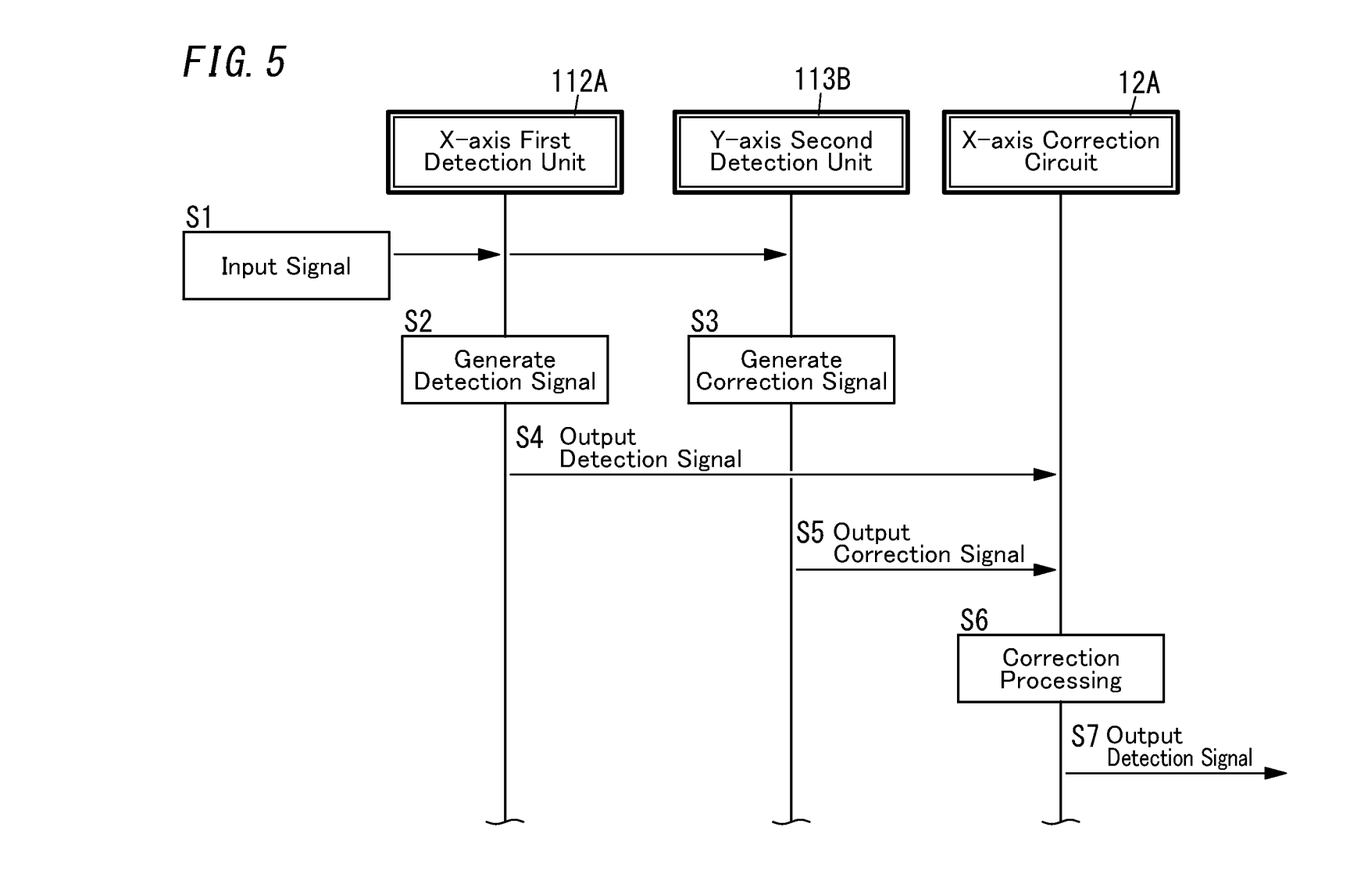
FIG. 5 is a sequence chart showing how the signal processing device operates.

Next, the operation of the signal processing device 1 according to this embodiment will be described with reference to a sequence chart shown in FIG. 5. In the following description, it will be described how to correct, in a situation where the acceleration is acting in the X-axis direction and the Y-axis direction, an error represented by the other axis sensitivity in the X-axis direction that is caused by the acceleration in the Y-axis direction. Note that in the following description, only the other axis sensitivity in the X-axis direction will be described with description of the other axis sensitivities in the Y- and Z-axis directions omitted, because almost the same statement applies to the other axis sensitivities in the Y- and Z-axis directions.

When detecting the acceleration in the X-axis direction, the X-axis detection element 2A provides an output signal Sig1 to the X-axis detection circuit 11A of the signal processing device 1 (in a first step S1). Meanwhile, when detecting the acceleration in the Y-axis direction, the Y-axis detection element 2B provides an output signal Sig1 to the Y-axis detection circuit 11B (in the first step S1). The output signal Sig1 supplied to the X-axis detection circuit 11A is converted into an analog voltage signal by the CV converter circuit 111 and provided to the X-axis first detection unit 112A and the X-axis second detection unit 113A. On the other hand, the output signal Sig1 supplied to the Y-axis detection circuit 11B is converted into an analog voltage signal by the CV converter circuit 111 and provided to the Y-axis first detection unit 112B and the Y-axis second detection unit 113B.

The X-axis first detection unit 112A generates a detection signal Sig2 based on the output signal of the CV converter circuit 111 (in a second step S2). Meanwhile, the Y-axis second detection unit 113B generates a correction signal Sig3 based on the output signal of the CV converter circuit 111 (in a third step S3). The X-axis first detection unit 112A outputs the detection signal Sig2 thus generated to the X-axis correction circuit 12A (in a fourth step S4). On the other hand, the Y-axis second detection unit 113B outputs the correction signal Sig3 thus generated to the X-axis correction circuit 12A (in a fifth step S5).

The X-axis correction circuit 12A generates, based on the detection signal Sig2 supplied from the X-axis first detection unit 112A and the correction signal Sig3 supplied from the Y-axis second detection unit 113B, a detection signal Sig4 which has had the error caused by the other axis sensitivity corrected (in a sixth step S6). Specifically, the X-axis correction circuit 12A subtracts the product of the correction signal Sig3 and the correction coefficient A1 from the detection signal Sig2. This allows the error represented by the other axis sensitivity in the X-axis direction caused by the acceleration in the Y-axis direction to be corrected. Then, the X-axis correction circuit 12A outputs the detection signal Sig4 to a control circuit which is mounted on the printed wiring board 100 (in a seventh step S7).

(4) Advantages

In the signal processing device 1 according to this embodiment, the detection range of the second detection unit 113 generating the correction signal Sig3 is broader than the detection range of the first detection unit 112 generating the detection signal Sig2. Therefore, as for the acceleration, the decrease in the minimum resolution (signal accuracy) may be curbed by having the acceleration detected by the first detection unit 112 that has a narrower detection range (i.e., a higher minimum resolution) than the second detection unit 113. Meanwhile, as for the other axis sensitivity, even if the magnitude of the acceleration causing the other axis sensitivity is significant, the effect of the other axis sensitivity may be reduced by having the other axis sensitivity detected by the second detection unit 113 that has a broader detection range than the first detection unit 112. In short, the signal processing device 1 according to this embodiment may reduce the effect of the other axis sensitivity while curbing the decrease in the minimum resolution (signal accuracy).

Moreover, in the signal processing device 1 according to this embodiment, each of the first detection unit 112 and the second detection unit 113 includes the A/D converter. Therefore, an analog output signal Sig1 supplied from the detection element 2 may be converted into a digital detection signal Sig2.

In addition, in the signal processing device 1 according to this embodiment, the detection elements 2 include the X-axis detection element 2A that detects inertial force in the X-axis direction, the Y-axis detection element 2B that detects inertial force in the Y-axis direction, and the Z-axis detection element 2C that detects inertial force in the Z-axis direction. Therefore, the signal processing device 1 may detect the inertial force in the X-axis direction, the inertial force in the Y-axis direction, and the inertial force in the Z-axis direction.

Furthermore, in the signal processing device 1 according to this embodiment, the X-axis detection circuit 11A includes the X-axis first detection unit 112A and the X-axis second detection unit 113A, the Y-axis detection circuit 11B includes the Y-axis first detection unit 112B and the Y-axis second detection unit 113B, and the Z-axis detection circuit 11C includes the Z-axis first detection unit 112C and the Z-axis second detection unit 113C. This allows reducing, in each of the X-axis direction, the Y-axis direction, and the Z-axis direction, the effect of the other axis sensitivity while curbing the decrease in the minimum resolution (signal accuracy).

(5) Variations

Note that the embodiment described above is only an exemplary one of various embodiments of the present disclosure and should not be construed as limiting. Rather, the embodiment may be readily modified in various manners depending on a design choice or any other factor without departing from the scope of the present disclosure. The functions of the signal processing device 1 according to the embodiment described above may also be implemented as a signal processing method, a computer program or a non-transitory storage medium on which the computer program is stored, for example.

A signal processing method according to an aspect is a signal processing method for processing output signals Sig1 of at least one detection element 2 that detects inertial force in at least two of three directions perpendicular to each other. As shown in FIG. 5, the signal processing method includes a first detection step (corresponding to the second step S2), a second detection step (corresponding to the third step S3), and a correction step (corresponding to the sixth step S6). The first detection step includes generating detection signals Sig2 based on the output signals Sig1 corresponding to the at least two directions. The second detection step includes generating, in a detection range broader than in the first detection step, correction signals Sig3 based on the output signals Sig1 corresponding to the at least two directions. The correction step includes correcting the detection signals Sig2. The correction step includes correcting an associated one of the detection signals Sig2 corresponding to each of the at least two directions with an associated one of the correction signals Sig3 corresponding to at least one direction, other than one direction subjected to correction, out of the at least two directions.

A program according to another aspect is designed to cause one or more processors to perform the signal processing method described above.

Next, variations of the exemplary embodiment described above will be enumerated one after another. The variations to be described below may be adopted in combination as appropriate.

The signal processing device 1 according to the present disclosure includes a computer system. The computer system includes a processor and a memory as principal hardware components. The functions of the signal processing device 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, in the embodiment described above, a plurality of constituent elements of the signal processing device 1 are integrated together in a single housing. However, this is not an essential configuration for the signal processing device 1. Alternatively, those constituent elements of the signal processing device 1 may be distributed in multiple different housings. Still alternatively, at least some functions of the signal processing device 1 (e.g., the function of the correction circuit 12) may be implemented as a cloud computing system as well.

(5.1) First variation

A first variation of the inertial sensor 10 according to this embodiment will be described with reference to FIG. 6.

Figure 6:
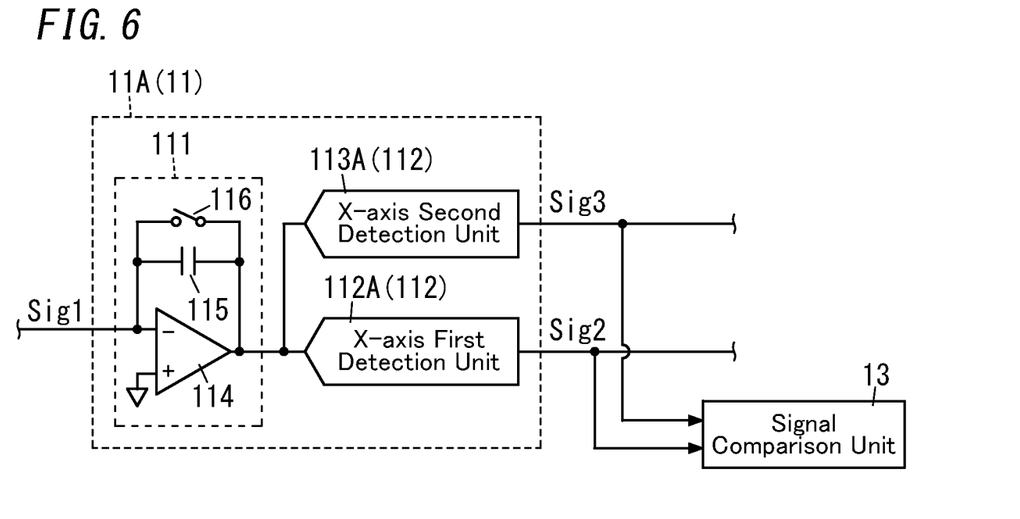
FIG. 6 is a schematic diagram illustrating a partial configuration of a signal processing device 1 according to a variation of the present disclosure.

As shown in FIG. 6, the inertial sensor 10 according to the first variation includes a signal comparison unit 13, which is a difference from the inertial sensor 10 according to the embodiment described above. The inertial sensor 10 according to the first variation has the same configuration as the inertial sensor 10 according to the exemplary embodiment described above except the signal comparison unit 13. Therefore, any constituent element of the inertial sensor 10 according to the first variation, having the same function as a counterpart of the exemplary embodiment described above, will be designated by the same reference numeral as that counterpart's, and description thereof will be omitted herein. FIG. 6 shows the X-axis detection circuit 11A for detecting the acceleration in the X-axis direction, out of the plurality of detection circuits 11.

The inertial sensor 10 according to the first variation includes the signal processing device 1 and the plurality of detection elements 2. Moreover, the inertial sensor 10 according to the first variation further includes the signal comparison unit 13. As shown in FIG. 6, the signal comparison unit 13 receives the detection signal Sig2 from the first detection unit 112 and the correction signal Sig3 from the second detection unit 113, and compares the values of the detection signal Sig2 and the correction signal Sig3. The comparison result obtained by the signal comparison unit 13 is provided to the control circuit mounted on the printed wiring board 100. The control circuit decides, based on the comparison result provided by the signal comparison unit 13, that both the first detection unit 112 and the second detection unit 113 should be operating properly, when finding the values of the detection signal Sig2 and the correction signal Sig3 agreeing with each other. On the other hand, the control circuit decides, based on the comparison result provided by the signal comparison unit 13, that at least one of the first detection unit 112 or the second detection unit 113 should be operating improperly (to be out of order), when finding the values of the detection signal Sig2 and the correction signal Sig3 disagreeing with each other. As used herein, the term "agreeing" refers to not only a case where two values completely agree with each other, but also a case where the difference between the two values falls within a predetermined range. Therefore, the control circuit decides that the values of the detection signal Sig2 and the correction signal Sig3 should agree with each other, if the difference between the values of the detection signal Sig2 and the correction signal Sig3 falls within the predetermined range.

The inertial sensor 10 according to the first variation includes the signal comparison unit 13, and therefore, may determine whether the first detection unit 112 and the second detection unit 113 are operating properly or not.

In this embodiment, in FIG. 6, the signal comparison unit 13 is provided for the X-axis detection circuit 11A for detecting the acceleration in the X-axis direction, out of the plurality of detection circuits 11. Alternatively, the signal comparison unit may be provided for the Y-axis detection circuit 11B for detecting the acceleration in the Y-axis direction and/or the signal comparison unit may be provided for the Z-axis detection circuit 11C for detecting the acceleration in the Z-axis direction. In other words, the signal comparison unit may be provided for at least one of the X-axis detection circuit 11A, the Y-axis detection circuit 11B, or the Z-axis detection circuit 11C.

(5.2) Other Variations

In the embodiment described above, the inertial sensor 10 is implemented as a capacitive sensor. However, the inertial sensor 10 may also be, for example, a piezoresistive sensor.

In the embodiment described above, the inertial sensor 10 is implemented as a triaxial acceleration sensor. However, the inertial sensor 10 may also be, for example, a biaxial acceleration sensor.

In the embodiment described above, the acceleration in the X-axis direction, the acceleration in the Y-axis direction, and the acceleration in the Z-axis direction are detected separately by three different detection circuits 11. However, for example, the acceleration in the X-axis direction, the acceleration in the Y-axis direction, and the acceleration in the Z-axis direction may be detected by one detection circuit. In that case, a multiplexor may be used to time-sequentially detect the acceleration in the X-axis direction, the acceleration in the Y-axis direction, and the acceleration in the Z-axis direction in this order.

In the embodiment described above, the inertial sensor 10 is a surface-mounted sensor. However, the inertial sensor 10 may also be, for example, a through hole mounted sensor.

In the embodiment described above, the inertial sensor 10 is an acceleration sensor. However, the inertial sensor 10 does not have to be an acceleration sensor, but may be, for example, an angular velocity sensor (gyrosensor).

In the embodiment described above, the signal processing device 1 is an ASIC. However, the signal processing device 1 is not limited to the ASIC but may also be an FPGA (Field-Programmable Gate Array) or made up of one or more processors and one or more memories.

In the embodiment described above, the acceleration in the X-axis direction, the acceleration in the Y-axis direction, and the acceleration in the Z-axis direction are detected separately by three different detection elements 2. However, for example, the acceleration in the X-axis direction, the acceleration in the Y-axis direction, and the acceleration in the Z-axis direction may be detected by one detection element. Specifically, the detection element may also be implemented as a MEMS (microelectromechanical systems) element in which the functions of detecting the acceleration in the X-axis direction, the acceleration in the Y-axis direction, and the acceleration in the Z-axis direction are integrated into one chip.

In the embodiment described above, each of the first detection unit 112 and the second detection unit 113 is an A/D converter. However, each of the first detection unit 112 and the second detection unit 113 may also be an operational amplifier, for example. In other words, each of the first detection unit 112 and the second detection unit 113 may be an analog circuit. Even when an operational amplifier is used as each of the first detection unit 112 and the second detection unit 113, the same problem also arises that the sensitivity decreases as the detection range of the signal is extended, because there is a trade-off relationship between the detection range and the sensitivity. To overcome this problem, an operational amplifier may be selected so that the signal amplitude of the operational amplifier serving as the second detection unit 113 is larger than the signal amplitude of the operational amplifier serving as the first detection unit 112. This configuration may reduce the effect of other axis sensitivity while curbing the decrease in sensitivity, as significantly as the signal processing device 1 according to the embodiment described above.

(Recapitulation)

As can be seen from the foregoing description, a signal processing device (1) according to a first aspect includes detection circuitry (11) and correction circuitry (12). The detection circuitry (11) generates detection signals (Sig2) based on output signals (Sig1) of at least one detection element (2) that detects inertial force in at least two of three directions perpendicular to each other. The correction circuitry (12) corrects the detection signals (Sig2). The detection circuitry (11) includes a first detection unit (112) and a second detection unit (113). The first detection unit (112) generates at least one of the detection signals (Sig2) based on an associated one of the output signals (Sig1) corresponding to each of the at least two directions. The second detection unit (113) has a broader detection range than the first detection unit (112) and generates at least one correction signal (Sig3) based on the associated one of the output signals (Sig1) corresponding to each of the at least two directions. The correction circuitry (12) corrects an associated one of the detection signals (Sig2) corresponding to each of the at least two directions with at least an associated one of the correction signals (Sig3) corresponding to at least one direction, other than one direction subjected to correction, out of the at least two directions.

According to this aspect, the second detection unit (113) has a broader detection range than the first detection unit (112). This allows reducing the effect of the other axis sensitivity while curbing a decrease in sensitivity.

In a signal processing device (1) according to a second aspect, which may be implemented in conjunction with the first aspect, each of the first detection unit (112) and the second detection unit (113) includes an A/D converter.

According to this aspect, an analog output signal (Sig1) supplied from the detection element (2) may be converted into a digital detection signal (Sig2).

In a signal processing device (1) according to a third aspect, which may be implemented in conjunction with the first or second aspect, the at least two directions are an X-axis direction, a Y-axis direction, and a Z-axis direction which are perpendicular to each other. The at least one detection element (2) includes an X-axis detection element (2A), a Y-axis detection element (2B) and a Z-axis detection element (2C). The X-axis detection element (2A) detects inertial force in the X-axis direction. The Y-axis detection element (2B) detects inertial force in the Y-axis direction. The Z-axis detection element (2C) detects inertial force in the Z-axis direction.

This aspect allows detecting the inertial force in the X-axis direction, the inertial force in the Y-axis direction, and the inertial force in the Z-axis direction.

In a signal processing device (1) according to a fourth aspect, which may be implemented in conjunction with any one of the first to third aspects, the at least two directions are an X-axis direction, a Y-axis direction, and a Z-axis direction which are perpendicular to each other. The detection circuitry (11) includes an X-axis detection circuit (11A), a Y-axis detection circuit (11B), and a Z-axis detection circuit (11C). The X-axis detection circuit (11A) generates an associated one of the detection signals (Sig2) based on an associated one of the output signals (Sig1) which is supplied from an X-axis detection element (2A) serving as the at least one detection element (2) that detects inertial force in the X-axis direction. The Y-axis detection circuit (11B) generates an associated one of the detection signals (Sig2) based on an associated one of the output signals (Sig1) which is supplied from a Y-axis detection element (2B) serving as the at least one detection element (2) that detects inertial force in the Y-axis direction. The Z-axis detection circuit (11C) generates an associated one of the detection signals (Sig2) based on an associated one of the output signals (Sig1) supplied from a Z-axis detection element (2C) serving as the at least one detection element (2) that detects inertial force in the Z-axis direction. The X-axis detection circuit (11A) includes an X-axis first detection unit (112A) serving as the first detection unit (112) and an X-axis second detection unit (113A) serving as the second detection unit (113). The Y-axis detection circuit (11B) includes a Y-axis first detection unit (112B) serving as the first detection unit (112) and a Y-axis second detection unit (113B) serving as the second detection unit (113). The Z-axis detection circuit (11C) includes a Z-axis first detection unit (112C) serving as the first detection unit (112) and a Z-axis second detection unit (113C) serving as the second detection unit (113).

This aspect allows reducing, in each of the X-axis direction, the Y-axis direction, and the Z-axis direction, the effect of the other axis sensitivity while curbing a decrease in sensitivity.

A signal processing device (1) according to a fifth aspect, which may be implemented in conjunction with any one of the first to fourth aspects, further includes a signal comparison unit (13) for comparing each of the detection signals (Sig2) supplied from the first detection unit (112) with an associated one of the correction signals (Sig3) supplied from the second detection unit (113).

This aspect allows detecting, based on the comparison result provided by the signal comparison unit (13), that at least one of the first detection unit (112) or the second detection unit (113) is operating improperly (or out of order).

An inertial sensor (10) according to a sixth aspect includes the signal processing device (1) according to any one of the first to fifth aspects and the at least one detection element (2).

According to this aspect, the second detection unit (113) has a broader detection range than the first detection unit (112). This allows reducing the effect of the other axis sensitivity while curbing a decrease in sensitivity.

A signal processing method according to a seventh aspect is a signal processing method for processing output signals (Sig1) of at least one detection element (2) that detects inertial force in at least two of three directions perpendicular to each other. The signal processing method includes a first detection step (S2), a second detection step (S3), and a correction step (S6). The first detection step (S2) includes generating detection signals (Sig2) based on the output signals (Sig1) corresponding to the at least two directions. The second detection step (S3) includes generating, in a detection range broader than in the first detection step (S2), correction signals (Sig3) based on the output signals (Sig1) corresponding to the at least two directions. The correction step (S6) includes correcting the detection signals (Sig2). The correction step (S6) includes correcting an associated one of the detection signals (Sig2) corresponding to each of the at least two directions with at least an associated one of the correction signals (Sig3) corresponding to at least one direction, other than one direction subjected to correction, out of the at least two directions.

According to this aspect, the second detection unit (113) has a broader detection range than the first detection unit (112). This allows reducing the effect of the other axis sensitivity while curbing a decrease in sensitivity.

A program according to an eighth aspect is designed to cause one or more processors to perform the signal processing method according to the seventh aspect.

According to this aspect, the second detection unit (113) has a broader detection range than the first detection unit (112). This allows reducing the effect of the other axis sensitivity while curbing the decrease in sensitivity.

Note that the constituent elements according to the second to fifth aspects are not essential constituent elements for the signal processing device (1) but may be omitted as appropriate.

REFERENCE SIGNS LIST

1 Signal Processing Device
11 Detection Circuit
11A X-axis Detection Circuit
11B Y-axis Detection Circuit
11C Z-axis Detection Circuit
110 A/D Converter
112 First Detection Unit
112A X-axis First Detection Unit
112B Y-axis First Detection Unit
112C Z-axis First Detection Unit
113 Second Detection Unit
113A X-axis Second Detection Unit
113B Y-axis Second Detection Unit
113C Z-axis Second Detection Unit
12 Correction Circuit
13 Signal Comparison Unit
2 Detection Element
2A X-axis Detection Element
2B Y-axis Detection Element
2C Z-axis Detection Element
10 Inertial Sensor
Sig1 Output Signal
Sig2 Detection Signal
Sig3 Correction Signal
S2 Second Step (First Detection Step)
S3 Third Step (Second Detection Step)
S6 Sixth Step (Correction Step)

The invention claimed is:

1. A signal processing device comprising:
detection circuitry configured to generate at least two detection signals based on at least two output signals of at least one detection element, the at least one detection element being configured to detect inertial force in at least two directions of three directions perpendicular to each other; and
correction circuitry configured to correct the at least two detection signals,
the detection circuitry including:
a first detection unit configured to generate the at least two detection signals corresponding to the at least two directions, respectively, the first detection unit being configured to generate each of the at least two detection signals based on an associated one of the at least two output signals of an associated one of the at least two directions; and
a second detection unit having a broader detection range than the first detection unit and configured to generate at least two correction signals corresponding to the at least two directions, the second detection unit being configured to generate each of the at least two correction signals based on an associated one of the at least two output signals of an associated one of the at least two directions;
the correction circuitry being configured to correct each of the at least two detection signals corresponding to the at least two directions with at least one of the at least two correction signals corresponding to at least one direction, other than the one direction subjected to correction, out of the at least two directions and without the correction signal corresponding to the one direction subjected to correction.

2. The signal processing device of claim 1, wherein each of the first detection unit and the second detection unit includes an A/D converter.

3. The signal processing device of claim 2, wherein the at least two directions are an X-axis direction, a Y-axis direction, and a Z-axis direction which are perpendicular to each other, and
the at least one detection element includes:
an X-axis detection element configured to detect inertial force in the X-axis direction;
a Y-axis detection element configured to detect inertial force in the Y-axis direction; and
a Z-axis detection element configured to detect inertial force in the Z-axis direction.

4. The signal processing device of claim 2, wherein the at least two directions are an X-axis direction, a Y-axis direction, and a Z-axis direction which are perpendicular to each other,
the detection circuitry includes:
an X-axis detection circuit configured to generate an associated one of the at least two detection signals based on an associated one of the at least two output signals which is supplied from an X-axis detection element serving as the at least one detection element configured to detect inertial force in the X-axis direction;
a Y-axis detection circuit configured to generate an associated one of the at least two detection signals based on an associated one of the at least two output signals which is supplied from a Y-axis detection element serving as the at least one detection element configured to detect inertial force in the Y-axis direction; and
a Z-axis detection circuit configured to generate an associated one of the at least two detection signals based on an associated one of the at least two output signals supplied from a Z-axis detection element serving as the at least one detection element configured to detect inertial force in the Z-axis direction,
the X-axis detection circuit includes an X-axis first detection unit serving as the first detection unit and an X-axis second detection unit serving as the second detection unit,
the Y-axis detection circuit includes a Y-axis first detection unit serving as the first detection unit and a Y-axis second detection unit serving as the second detection unit, and
the Z-axis detection circuit includes a Z-axis first detection unit serving as the first detection unit and a Z-axis second detection unit serving as the second detection unit.

5. The signal processing device of claim 2, further comprising a signal comparison unit configured to compare each of the detection signals supplied from the first detection unit with an associated one of the correction signals supplied from the second detection unit.

6. The signal processing device of claim 1, wherein
the at least two directions are an X-axis direction, a Y-axis direction, and a Z-axis direction which are perpendicular to each other, and the at least one detection element includes:
   an X-axis detection element configured to detect inertial force in the X-axis direction;
   a Y-axis detection element configured to detect inertial force in the Y-axis direction; and
   a Z-axis detection element configured to detect inertial force in the Z-axis direction.

7. The signal processing device of claim 6, wherein
the at least two directions are an X-axis direction, a Y-axis direction, and a Z-axis direction which are perpendicular to each other,
the detection circuitry includes:
   an X-axis detection circuit configured to generate an associated one of the at least two detection signals based on an associated one of the at least two output signals which is supplied from an X-axis detection element serving as the at least one detection element configured to detect inertial force in the X-axis direction;
   a Y-axis detection circuit configured to generate an associated one of the at least two detection signals based on an associated one of the at least two output signals which is supplied from a Y-axis detection element serving as the at least one detection element configured to detect inertial force in the Y-axis direction; and
   a Z-axis detection circuit configured to generate an associated one of the at least two detection signals based on an associated one of the at least two output signals supplied from a Z-axis detection element serving as the at least one detection element configured to detect inertial force in the Z-axis direction,
the X-axis detection circuit includes an X-axis first detection unit serving as the first detection unit and an X-axis second detection unit serving as the second detection unit,
the Y-axis detection circuit includes a Y-axis first detection unit serving as the first detection unit and a Y-axis second detection unit serving as the second detection unit, and
the Z-axis detection circuit includes a Z-axis first detection unit serving as the first detection unit and a Z-axis second detection unit serving as the second detection unit.

8. The signal processing device of claim 6, further comprising a signal comparison unit configured to compare each of the detection signals supplied from the first detection unit with an associated one of the correction signals supplied from the second detection unit.

9. The signal processing device of claim 1, wherein the at least two directions are an X-axis direction, a Y-axis direction, and a Z-axis direction which are perpendicular to each other,
the detection circuitry includes:
   an X-axis detection circuit configured to generate an associated one of the at least two detection signals based on an associated one of the at least two output signals which is supplied from an X-axis detection element serving as the at least one detection element configured to detect inertial force in the X-axis direction;
   a Y-axis detection circuit configured to generate an associated one of the at least two detection signals based on an associated one of the at least two output signals which is supplied from a Y-axis detection element serving as the at least one detection element configured to detect inertial force in the Y-axis direction; and
   a Z-axis detection circuit configured to generate an associated one of the at least two detection signals based on an associated one of the at least two output signals supplied from a Z-axis detection element serving as the at least one detection element configured to detect inertial force in the Z-axis direction,
the X-axis detection circuit includes an X-axis first detection unit serving as the first detection unit and an X-axis second detection unit serving as the second detection unit,
the Y-axis detection circuit includes a Y-axis first detection unit serving as the first detection unit and a Y-axis second detection unit serving as the second detection unit, and
the Z-axis detection circuit includes a Z-axis first detection unit serving as the first detection unit and a Z-axis second detection unit serving as the second detection unit.

10. The signal processing device of claim 9, further comprising a signal comparison unit configured to compare each of the detection signals supplied from the first detection unit with an associated one of the correction signals supplied from the second detection unit.

11. An inertial sensor comprising:
the signal processing device of claim 1; and
the at least one detection element.

12. The signal processing device of claim 1, further comprising a signal comparison unit configured to compare each of the detection signals supplied from the first detection unit with an associated one of the correction signals supplied from the second detection unit.

13. A signal processing method for processing at least two output signals of at least one detection element configured to detect inertial force in at least two directions of three directions perpendicular to each other, the method comprising:
   a first detection step including generating at least two detection signals corresponding to the at least two directions, respectively, the first detection step including generating each of the at least two detection signals based on the at least two output signals of an associated one of the at least two directions;
   a second detection step including generating, in a detection range broader than in the first detection step, at least two correction signals corresponding to the at least two directions, the second detection step including generating each of the at least two correction signals based on an associated one of the at least two output signals of an associated one of to the at least two directions; and
   a correction step including correcting the detection signals,
the correction step including correcting each of the at least two detection signals corresponding to the at least two directions with at least one of the at least two correction signals corresponding to at least one direction, other than the one direction subjected to correction, out of the at least two directions and without the correction signal corresponding to the one direction subjected to correction.

14. A non-transitory computer-readable tangible recording medium storing a program designed to cause one or more processors to perform the signal processing method of claim 13.

* * * * *